United States Patent
Parsonnet

(10) Patent No.: US 9,203,239 B2
(45) Date of Patent: Dec. 1, 2015

(54) SYSTEM AND METHOD FOR IMPROVING GRID EFFICIENCY UTILIZING STATISTICAL DISTRIBUTION CONTROL

(75) Inventor: Brian Parsonnet, Fort Collins, CO (US)

(73) Assignee: GREENER-ICE SPV, L.L.C., Scottsdale, AZ (US)

(*) Notice: Subject to any disclaimer, the term of this patent is extended or adjusted under 35 U.S.C. 154(b) by 740 days.

(21) Appl. No.: 13/481,375

(22) Filed: May 25, 2012

(65) Prior Publication Data
US 2013/0134780 A1 May 30, 2013

Related U.S. Application Data

(60) Provisional application No. 61/490,308, filed on May 26, 2011.

(51) Int. Cl.
*H02J 3/14* (2006.01)
*H02J 3/00* (2006.01)
*H02J 3/28* (2006.01)
(Continued)

(52) U.S. Cl.
CPC ............ *H02J 3/005* (2013.01); *G06Q 10/06* (2013.01); *G06Q 50/06* (2013.01); *H02J 3/14* (2013.01); *H02J 3/28* (2013.01); *H02J 2003/003* (2013.01); *H02J 2003/143* (2013.01); *Y02B 70/3225* (2013.01); *Y02B 70/3266* (2013.01);
(Continued)

(58) Field of Classification Search
CPC ............ H02J 3/005; H02J 3/28; H02J 3/14; H02J 2003/003; H02J 2003/143; G06Q 50/06; G06Q 10/06; Y02B 70/3266; Y02B 70/3225; Y04S 20/222; Y04S 20/242

USPC .......................................................... 307/31
See application file for complete search history.

(56) References Cited

U.S. PATENT DOCUMENTS

| 1,969,187 A | 8/1934 | Schutt |
| 2,512,576 A | 6/1950 | Cross |

(Continued)

FOREIGN PATENT DOCUMENTS

| DE | 100 57 834 A1 | 9/1957 |
| DE | 298 23 175 U1 | 7/1999 |

(Continued)

OTHER PUBLICATIONS

U.S. Appl. No. 11/138,762, Non-Final Office Action, pp. 1-15.
U.S. Appl. No. 11/138,762, Final Office Action, pp. 1-6.
U.S. Appl. No. 11/284,533, Non Final Office Action, pp. 1-11.
International Search Report for PCT/US2005/042409, International Searching Authority, Oct. 5, 2006, pp. 1-17.

(Continued)

*Primary Examiner* — Jared Fureman
*Assistant Examiner* — Duc M Pham
(74) *Attorney, Agent, or Firm* — Paul M. Thompson; Cochran Freund & Young LLC

(57) ABSTRACT

Disclosed is a system and method for improving grid efficiency, reliability, security and capacity, utilizing energy storage over a plurality of on-site energy storing appliances, and also utilizing on-site demand reduction devices lacking storage, all controlled via configuration settings with a local means to act independently, yet in statistical coordination, to provide a desired effect. The appliance and controller are located on the downstream side of the end-users power meter, and facilitates the utilization of the stored energy and manages the optimal timing for producing and delivering the stored energy to the end-user. This model demonstrates a utility driven, disaggregated, distributed energy system, where the distributed energy resource is designed to behave as an offset to the predictable daily electrical demand profile.

42 Claims, 7 Drawing Sheets

(51) Int. Cl.
*G06Q 10/06* (2012.01)
*G06Q 50/06* (2012.01)

(52) U.S. Cl.
CPC .............. *Y04S20/222* (2013.01); *Y04S 20/242* (2013.01); *Y10T 307/359* (2015.04); *Y10T 307/549* (2015.04)

(56) References Cited

U.S. PATENT DOCUMENTS

| | | |
|---|---|---|
| 2,661,576 A | 12/1953 | Gartner |
| 2,737,027 A | 3/1956 | Kleist |
| 3,156,101 A | 11/1964 | McGuffey |
| 3,746,084 A | 7/1973 | Ostbo |
| 4,073,306 A | 2/1978 | Neyer |
| 4,129,014 A | 12/1978 | Chubb |
| 4,176,525 A | 12/1979 | Tucker et al. |
| 4,274,849 A | 6/1981 | Garier et al. |
| 4,280,335 A | 7/1981 | Perez et al. |
| 4,291,757 A | 9/1981 | Redden |
| 4,294,078 A | 10/1981 | MacCracken |
| 4,313,309 A | 2/1982 | Lehman, Jr. |
| 4,403,645 A | 9/1983 | MacCracken |
| 4,484,449 A | 11/1984 | Muench |
| 4,565,069 A | 1/1986 | MacCracken |
| 4,608,836 A | 9/1986 | MacCracken et al. |
| 4,609,036 A | 9/1986 | Schrader |
| 4,619,317 A | 10/1986 | Disselbeck et al. |
| 4,656,839 A | 4/1987 | Cross et al. |
| 4,735,064 A | 4/1988 | Fischer |
| 4,745,767 A | 5/1988 | Ohya et al. |
| 4,893,476 A | 1/1990 | Bos et al. |
| 4,916,916 A | 4/1990 | Fischer |
| 4,921,100 A | 5/1990 | Krause |
| 4,940,079 A | 7/1990 | Best et al. |
| 4,964,279 A | 10/1990 | Osborne |
| 5,005,368 A | 4/1991 | MacCracken et al. |
| 5,036,904 A | 8/1991 | Kanda et al. |
| 5,079,929 A | 1/1992 | Alsenz |
| 5,109,920 A | 5/1992 | Merryfull |
| 5,211,029 A | 5/1993 | Uselton et al. |
| 5,237,832 A | 8/1993 | Alston |
| 5,241,829 A | 9/1993 | Irie et al. |
| 5,255,526 A | 10/1993 | Fischer |
| 5,307,642 A | 5/1994 | Dean |
| 5,323,618 A | 6/1994 | Yoshida et al. |
| 5,335,508 A | 8/1994 | Tippmann |
| 5,366,153 A | 11/1994 | Swenson |
| 5,383,339 A | 1/1995 | McCloskey et al. |
| 5,423,378 A | 6/1995 | Dillenbeck et al. |
| 5,467,812 A | 11/1995 | Dean et al. |
| 5,598,716 A | 2/1997 | Tanaka et al. |
| 5,598,720 A | 2/1997 | MacCracken et al. |
| 5,647,225 A | 7/1997 | Fischer et al. |
| 5,678,626 A | 10/1997 | Gilles |
| 5,682,752 A | 11/1997 | Dean |
| 5,715,202 A | 2/1998 | Harima |
| 5,720,178 A | 2/1998 | Silvetti et al. |
| 5,740,679 A | 4/1998 | Ueno et al. |
| 5,755,104 A | 5/1998 | Rafalovich et al. |
| 5,927,101 A | 7/1999 | Oh |
| 5,992,160 A | 11/1999 | Bussjager et al. |
| 6,112,543 A | 9/2000 | Feuerecker et al. |
| 6,131,398 A | 10/2000 | Versteijnen |
| 6,131,401 A | 10/2000 | Ueno et al. |
| 6,158,499 A | 12/2000 | Rhodes et al. |
| 6,212,898 B1 | 4/2001 | Ueno et al. |
| 6,237,358 B1 | 5/2001 | Kondo et al. |
| 6,247,522 B1 | 6/2001 | Kaplan et al. |
| 6,250,098 B1 | 6/2001 | Huang |
| 6,260,376 B1 | 7/2001 | Khelifa et al. |
| 6,298,683 B1 | 10/2001 | Kondo et al. |
| 6,327,871 B1 | 12/2001 | Rafalovich |
| 6,370,908 B1 | 4/2002 | James |
| 6,460,355 B1 | 10/2002 | Trieskey |
| 6,474,089 B1 | 11/2002 | Chen |
| D501,490 S | 2/2005 | Kerrigan |
| 6,895,773 B2 | 5/2005 | Amaral |
| 7,124,594 B2 | 10/2006 | McRell |
| 7,152,413 B1 | 12/2006 | Anderson |
| 7,162,878 B2 | 1/2007 | Narayanamurthy et al. |
| 7,210,308 B2 | 5/2007 | Tanimoto et al. |
| 7,363,772 B2 | 4/2008 | Narayanamurthy |
| 7,388,348 B2 | 6/2008 | Mattichak |
| 7,421,846 B2 | 9/2008 | Narayanamurthy et al. |
| 7,503,185 B2 | 3/2009 | Narayanamurthy |
| 7,543,455 B1 | 6/2009 | Chen |
| 7,610,773 B2 | 11/2009 | Rafalovich et al. |
| 7,690,212 B2 | 4/2010 | Narayanamurthy et al. |
| 7,783,390 B2* | 8/2010 | Miller .......................... 700/291 |
| 7,793,515 B2 | 9/2010 | Narayanamurthy |
| 7,836,721 B2 | 11/2010 | Nishiwaki et al. |
| 8,015,836 B2 | 9/2011 | Kameyama et al. |
| 2002/0124583 A1 | 9/2002 | Satoh |
| 2002/0162342 A1 | 11/2002 | Weng et al. |
| 2004/0007011 A1 | 1/2004 | Tanaka |
| 2004/0221589 A1 | 11/2004 | Dube et al. |
| 2005/0081557 A1 | 4/2005 | McRell |
| 2005/0132734 A1 | 6/2005 | Narayanamurthy et al. |
| 2005/0262870 A1 | 12/2005 | Narayanamurthy et al. |
| 2006/0199051 A1* | 9/2006 | Bai et al. ........................ 429/17 |
| 2007/0095093 A1 | 5/2007 | Narayanamurthy |
| 2008/0034760 A1 | 2/2008 | Narayanamurthy et al. |
| 2008/0141699 A1 | 6/2008 | Rafalovich et al. |
| 2009/0133412 A1 | 5/2009 | Narayanamurthy et al. |
| 2010/0170286 A1 | 7/2010 | Ghiraldi |
| 2010/0179704 A1 | 7/2010 | Ozog |
| 2011/0011119 A1 | 1/2011 | Kuehl et al. |
| 2012/0221164 A1* | 8/2012 | Igata ............................ 700/295 |
| 2013/0013121 A1* | 1/2013 | Henze et al. .................. 700/291 |

FOREIGN PATENT DOCUMENTS

| | | |
|---|---|---|
| DE | 198 31 127 A1 | 3/2001 |
| DE | 1 015 019 | 6/2002 |
| EP | 0 641 978 B2 | 7/1998 |
| EP | 1 441 193 A1 | 7/2004 |
| JP | 58-217133 | 12/1983 |
| JP | 60 036835 A | 2/1985 |
| JP | A-2000-266368 | 1/1996 |
| JP | 8-226682 | 9/1996 |
| JP | 10-339483 | 12/1998 |
| JP | A-2001-296068 | 12/1998 |
| JP | 8-14628 | 9/2000 |
| JP | A-2000-249420 | 10/2001 |
| WO | WO 2005/001345 A1 | 1/2005 |
| WO | WO 2005/038367 | 4/2005 |
| WO | WO 2005/116547 A | 12/2005 |
| WO | WO 2006/023716 A | 3/2006 |

OTHER PUBLICATIONS

International Search Report for PCT/US2005/018616, International Searching Authority, Oct. 10, 2005, pp. 1-14.
International Search Report for PCT/US2009/34087, International Searching Authority, pp. 1-13.
International Search Report for PCT/US2009/045427, International Searching Authority, pp. 1-11.
International Search Report for PCT/US2012/031168, International Searching Authority, pp. 1-18.
International Search Report for PCT/US2005/029535, International Searching Authority, May 12, 2005, pp. 1-12.
Notice of Allowance, U.S. Appl. No. 11/208,074, pp. 1-14.
Notice of Allowance, U.S. Appl. No. 12/100,893, pp. 1-15.
Non Final Office Action, U.S. Appl. No. 12/324,369, Dated Mar. 5, 2012, pp. 1-16.
International Search Report, International Searching Authority, Aug. 31, 2012, pp. 1-21.

* cited by examiner

SYSTEM AND METHOD FOR IMPROVING GRID EFFICIENCY UTILIZING STATISTICAL DISTRIBUTION CONTROL

CROSS REFERENCE TO RELATED APPLICATION

This application is based upon and claims the benefit of U.S. provisional application No. 61/490,308, entitled "System and Method for Improving Grid Efficiency Utilizing Statistical Distribution Control," filed May 26, 2011 and the entire disclosures of which is hereby specifically incorporated by reference for all that it discloses and teaches.

BACKGROUND OF THE INVENTION

With the increasing stress on peak demand power consumption, Thermal Energy Storage (TES) has been utilized to shift power consumption from on-peak to off-peak times and rates. A need exists for load shifting from peak to off-peak periods to stabilize and improve electrical power grid efficiency without impacting the end-user. Current thermal and non-thermal appliance units having energy storage systems have had limited success due to several deficiencies, including reliance on batteries which are inherently inefficient and water chillers that are practical only in large commercial buildings and have difficulty achieving high-efficiency.

In order to provide efficiency to the overall performance of an electric power grid (EPG), energy storage may have a significant ability to shift load away from periods of peak demand. Because electric power is primarily drawn from the EPG by millions of small to medium sized electrically driven units, the overall efficiency of the EPG may be significantly influenced by the performance of these electrical devices if they could act in concert to do so. However, the size of these smaller assets makes this difficult. Not only is the magnitude of their potential on-peak offset small, but the "shape" of that offset over time and various conditions may be irregular.

Systems for providing stored thermal energy have been previously contemplated in U.S. Pat. No. 4,735,064, U.S. Pat. No. 5,225,526, both issued to Harry Fischer, U.S. Pat. No. 5,647,225 issued to Fischer et al., U.S. Pat. No. 7,162,878 issued to Narayanamurthy et al., U.S. Pat. No. 7,854,129 issued to Narayanamurthy, U.S. Pat. No. 7,503,185 issued to Narayanamurthy et al., U.S. Pat. No. 7,827,807 issued to Narayanamurthy et al., U.S. Pat. No. 7,363,772 issued to Narayanamurthy, U.S. Pat. No. 7,793,515 issued to Narayanamurthy, U.S. patent application Ser. No. 11/837,356 filed Aug. 10, 2007 by Narayanamurthy et al., application Ser. No. 12/324,369 filed Nov. 26, 2008 by Narayanamurthy et al., U.S. patent application Ser. No. 12/371,229 filed Feb. 13, 2009 by Narayanamurthy et al., U.S. patent application Ser. No. 12/473,499 filed May 28, 2009 by Narayanamurthy et al., U.S. patent application Ser. No. 12/335,871 filed Dec. 16, 2008 by Parsonnet et al. and, U.S. Provisional Patent Application No. 61/470,841 filed Apr. 1, 2011 by Parsonnet et al. All of these patents and applications utilize TES to shift air conditioning loads from peak to off-peak electric rates to provide economic justification and are hereby incorporated by reference herein for all they teach and disclose.

SUMMARY OF THE INVENTION

An embodiment of the present invention may therefore comprise: an electric controller capable of independently operating an electric appliance comprising: the controller that controls a standard operation mode and an alternate operation mode of the appliance, the controller that provides information for the timing of the standard operation mode and the alternate operation mode of the appliance by execution of operational commands for the appliance, the controller that acts in statistical coordination with additional controllers on a plurality of the appliances that collectively provide a desired load offset to improve anticipated electric power grid conditions.

An embodiment of the present invention may also comprise: an electric appliance capable of operating using standard line voltage AC electricity supplied by an electric power grid in a standard operation mode, capable of storing the AC electricity in another form of energy in a charging mode, and operating using the energy stored with the appliance in an alternate operation mode comprising: an energy storage module that converts the AC electric energy to another form of energy and stores another form of energy to create stored energy in the charging mode, the appliance that utilizes the stored energy to operate the appliance in the alternate operation mode to perform approximately the same function as the standard operation mode, thereby reducing an end-user's demand for the electric energy during the alternate operation mode; a controller that independently controls the standard operation mode, the charging mode and the alternate operation mode of the appliance, the controller that contains information for the timing of the standard operation mode, the charging mode and the alternate operation mode of the appliance by execution of operational commands for the appliance, the controller that acts in statistical coordination with additional controllers on a plurality of appliances that collectively provide a desired load offset to improve anticipated electric power grid conditions.

An embodiment of the present invention may also comprise: an electric appliance capable of operating using standard line voltage AC electricity in a standard operation mode and operating using energy stored with the appliance in an alternate operation mode comprising: a thermal energy storage module that converts electric energy to thermal energy and stores the thermal energy in a charging mode, the appliance that utilizes the stored thermal energy to change the temperature within or outside of the appliance in the alternate operation mode thereby reducing an end-user's demand for the electric energy during the alternate operation mode; a controller that independently controls operation of the thermal energy storage unit and controls the conversion of the electric energy to the thermal energy and supply of the heating or the cooling of the appliance based upon execution of operational commands, the controller that contains information for the timing of the operational commands and that acts in statistical coordination with additional controllers on a plurality of appliances that collectively provide a desired load offset to improve anticipated electric power grid conditions.

An embodiment of the present invention may also comprise: a method of controlling an electric appliance comprising: controlling the operation of the electric appliance with a controller associated with the electric appliance; executing operational commands for switching modes of operation of the electrical appliance based upon information within the controller or directly assessed locally by the controller, between a standard operation mode and an alternate operation mode of the electric appliance, the alternate operation mode that reduces the demand for electricity from the electric appliance; timing the standard operation mode and the alternate operation mode based upon trigger points relating to electric power grid conditions; providing a desired load offset to improve electrical power grid conditions with the cumulative net effect of a plurality of individual storage appliances operating in statistical coordination to collectively reduce daily peak load of electric power grid conditions.

An embodiment of the present invention may also comprise: a method of improving the efficiency, reliability and capacity of an electric power grid containing a multitude of standard electric appliances capable of operating using AC electricity in a standard operation mode comprising: providing a plurality of stored electric appliances within a power distribution network of the electric power grid, the stored electric appliances capable of operating in the standard operation mode, capable of storing the AC electricity in another form of energy in a charging mode, and capable of operating using the energy stored in the charging mode in a stored operation mode; supplying AC power to the multitude of standard electric appliances and the plurality of stored electric appliances; operating the multitude of standard electric appliances in a standard operation mode with the AC electricity; operating at least a portion of the plurality of stored electric appliances in a standard operation mode with the AC electricity; charging at least a portion of the plurality of stored electric appliances in a charging mode by converting the AC electric energy to another form of energy and storing another form of energy with an energy storage module associated with the stored electric appliances to create stored energy; operating at least a portion of the plurality of the stored appliances in a stored operation mode for a period of time with the stored energy thereby reducing the demand for the AC electricity from the stored appliances during this time period; controlling the standard operation mode, the charging mode and the stored operation mode of the stored appliances with a controller that contains information for executing operational commands for the storage appliance; timing the standard operation mode, the charging mode and the stored operation mode of each stored electric appliance such that the net cumulative effect of individual stored electric appliances of the plurality of stored appliances act in statistical coordination to collectively provide a desired load offset to improve electric power grid conditions.

DETAILED DESCRIPTION OF THE INVENTION

Figure 1:
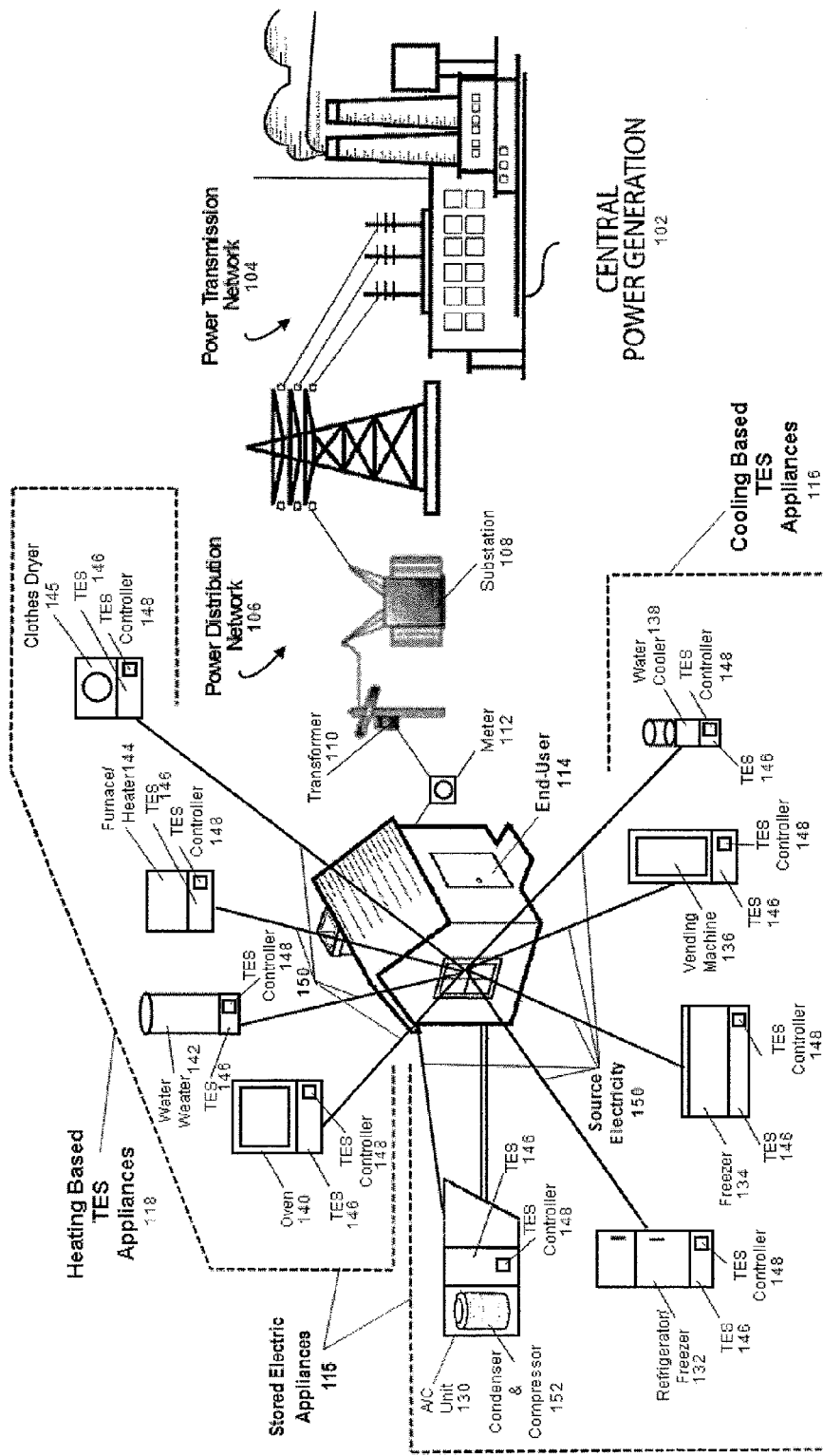
FIG. 1 illustrates an embodiment of a dwelling where a plurality of appliances are controlled so as to shift electric load away from periods of peak demand of an electric power grid.

While this invention is susceptible to embodiment in many different forms, it is shown in the drawings, and will be described herein in detail, specific embodiments thereof with the understanding that the present disclosure is to be considered as an exemplification of the principles of the invention and is not to be limited to the specific embodiments described.

FIG. 1 illustrates an embodiment of a system for improving grid efficiency utilizing energy storage whereby a number of energy storage units located in proximity to an end-user, convert electric energy to thermal energy in one time period, store this thermal energy for an amount of time, and later supply the stored thermal energy to the end-user thereby reducing the end-user's demand for grid supplied electric energy during this second time period. This embodiment illustrates a dwelling where a plurality of stored electric appliances 115 are controlled so as to shift load away from periods of peak demand of an electric power grid without disruption of service to the end-user of the appliance. This dwelling may be a residence, an office, an industrial structure, a school, a manufacturing facility, a retail store, a restaurant or any type of dwelling where power is drawn from the EPG. In particular, air conditioning (A/C) systems have a profound impact on the shape of the load on the grid, especially during summer months, creating roughly half of the on-peak demand. A/C demand is highly correlated with ambient temperature, as one might expect, but peak load is also governed by other assets and factors, many of which are also temperature dependent; power generation, transmission, distribution, and compressor assets all work less efficiently as temperature rises. The net effect is that grid demand is highly correlated with ambient temperature, although the specific nature of that correlation may change by region and season.

The control of the on-peak offset, sometimes referred to as demand management, also must consider the response of the asset after the demand management event ends. Some assets have a "recovery" response, also known as kick-back or rebound, during which time the asset uses more energy than it would have otherwise. This recovery, if not managed, tends to counter the demand management goals for the larger on-peak period, working in opposition to other coincident demand reducing actions. Storage at the asset can solve this problem by shifting the rebound time period all the way into the off-peak period, even offering an additional opportunity to optimize the timing of the rebound, along with the timing of the re-charge operating mode. One-way communication strategies to coordinate on-peak reductions or off-peak rebound, such as real-time pricing or critical peak signals, are inadequate because the resulting synchronous response would be insufficient to address the full desired load shape, which may span multiple hours. This might be solved by two-way communications, through which the assets can relate their capability or constraints, and thereby be "shaped" by remote controllers, but the contribution of the small asset is so small that the overhead for such two-way communications is too expensive or impractical. Furthermore, the build-out of such two-way communications and related infrastructure (databases, control algorithms, optimizers) will likely take a decade or more, and is yet unproven in scale. Issues in getting to scale are not insignificant, including security, safe or predictable operation during upsets or abnormal situations, and economic payback, to name a few. In leveling the on-peak and off-peak loads, real time control of assets is of interest. However, this too cannot address the entire problem, and would be greatly benefited by other independently acting solutions that inherently flatten the curve without remote control. Such independent behavior could be driven by the predicted shape of the average load curve, which in turn is driven overwhelmingly by the location of the sun and average annual temperature patterns.

In this embodiment, a controller controls the operation of the energy storage unit (in this example, a thermal energy storage unit) and controls the conversion of the electric energy to thermal energy and the supply of heating or cooling to the end-user from the TES unit, based upon optimizing electrical power grid performance. An EPG is a term used for an electricity network which may support all or some of the following four distinct operations: electricity generation; electric power transmission; electricity distribution; and, electricity control. For the purposes of this invention, an EPG is a network, and should not be taken to imply a particular physical layout or breadth. An EPG may be used to refer to an entire continent's electrical network, a regional transmission network, or may be used to describe a subnetwork, such as a local utility's transmission grid or distribution grid.

As an example, electricity in a remote location might be provided by a simple distribution grid linking a central generator to a plurality of residential homes. In developed countries, an EPG and the methods of moving electricity around are much more complex. In most instances, the central power generation (power generating plants) is located near a source of water, and away from heavily populated areas and are usually quite large. The electric power that is generated is stepped up to a higher voltage, at which it connects to a transmission network. The transmission network 104 will move the power long distances until it reaches its wholesale customer at the local distribution network 106. Upon arrival at the substation 108, the power will be stepped down in voltage from a transmission level voltage to a distribution level voltage. As it exits the substation 108, it enters the distribution wiring 107. Finally, upon arrival at the service location, the power is stepped down again from the distribution voltage to the required service voltage(s) with a local transformer. The power is delivered to the dwelling/customer 114 where it is measured with an individual meter 112. As electricity demand from the multitude of end users fluctuates, the ability for the EPG to respond with increased and decreased power input introduces a variety of power management issues.

Power management is the process of balancing the supply of electricity on the EPG with the electrical load from the customer by adjusting or controlling the load as well as the power station output. This can be achieved by direct intervention of the utility in real time, by bringing generation sources on and off line, the use of frequency sensitive relays triggering circuit breakers, by time clocks, or by using special tariffs to influence consumer behavior. Since electrical energy cannot be stored in bulk, it must be generated, shipped to the point where it is needed, and nearly immediately consumed. Consequently, for the generation and distribution of electrical power, power management is a subject that is continually on the minds of the electrical network operators (also known as transmission system operators). With ever increasing frequency, the load on a system can approach the maximum generating capacity, or the rate at which the load is increasing can surpass the rate at which generating output can be increased, even though there is ultimately enough capacity. When this happens, EPG operators must either find additional supplies of energy, or find ways to curtail the load. If they are unsuccessful within the time allowed, the system will become unstable and blackouts and brownouts can occur.

Based upon the aforementioned facts that electrical energy is most economically generated in bulk, but cannot be stored in bulk, methods and systems for providing power generation and distribution with on-site energy storage and power input, which is controlled by a utility or a third party manager, have been contemplated where the system allows a utility manager to decide and direct how energy is delivered to a customer on both sides of the power meter, while the customer directs and controls when and how much energy is needed. In this type of system, the utility controls the supply (either transmitted or stored) and makes power decisions on a system that acts as a virtual power plant, while the end-user retains control of the on-site aggregated power consumption assets. These systems act to broker the needs of the utility and end-user by creating, managing, and controlling the interface between these two entities (i.e., U.S. patent application Ser. No. 12/335,871, filed Dec. 16, 2008, by Parsonnet et al.). In contrast, the present embodiments utilize storing small quantities of power in a vast number of electrical devices (appliances), each of which may act to perform a small portion of a greater EPG optimization scheme utilizing statistical distribution control.

By utilizing a very large number of electrical devices (appliances), each with their own individual programming optimization pattern, a system may be developed to provide optimized EPG performance. The disclosed embodiments offer the advantage of using power from electric utility companies during low demand, and for off-peak hours (usually at night) when these companies use their most efficient equipment. For example, high efficiency electric generators, typically stream-driven, produce a kilowatt-hour (KWH) for approximately 8,900 BTU. In contrast, a peak hour high capacity electrical generator, such as a gas turbine, can use as much as 14,000 BTU to produce the same KWH of electricity. Second, the transmission lines also run cooler at night resulting in higher efficiency of energy usage. Finally, for air-cooled refrigerant circuit systems, operating the system at night affords a higher efficiency by lowering the temperature of the condensing unit.

The disclosed thermal energy storage systems are used as an example of one of many energy storage systems that may be utilized to operate at high efficiency and provide an overall system of Statistical Distribution Control (SDC) that shifts power usage without significant total energy losses. In addition, due to the increased efficiencies of off-peak power generation and off-peak compressor-based refrigerant cooling, a net reduction in the total energy consumption of an individual operating unit may be realized.

FIG. 1 illustrates an embodiment of a grid level power generation and distribution system with on-site energy storage (thermal) and power input to a single user controlled by the utility or a third party manager. In this embodiment, electricity from the central power generation 102 is delivered to the end-user 114 via the utility managed power transmission network 104 and the utility managed power distribution network 106. The power is delivered through the power meter 112 at the end-users site, after being stepped down at the substation 108 and transformer 110. In this example, a variety of electric devices (appliances) that may utilize energy storage (in this embodiment TES 146) are individually locally controlled with a TES controller 148. In this example, a cold-based TES appliance 116, such as an air conditioner unit 130, a refrigerator/freezer 132, a deep storage freezer 134, a refrigerated vending machine 136, a water cooler 138, or any other device utilizing cooling below ambient temperature, is connected to the source electricity 150 and draws power from the grid as needed. Additionally, FIG. 1 depicts a variety of heat-based electric devices (appliances) that may utilize energy storage (in this embodiment TES 146) are individually controlled with a TES controller 148.

In this example, heat-based TES appliances 116, such as an oven 140, a water heater 142, a furnace or space heater 144, a clothes dryer 152 or any other device utilizing heating above ambient temperature, is connected to the source electricity 150 and draws power from the grid as needed. Each appliance 116, 118 is equipped with TES 146, which is used to provide energy storage to the end-user 114 by supplementing, and/or replacing the cooling or heating supplied to the appliance by real time grid power. In this example, the appliance is located within, or in proximity to, the end-user 114 and is supplied with power from the dwelling by on-site power supply lines, although either or both of these devices may receive power from any other source, such as the central power generation 102, distributed energy resources, site generation or the like.

Because power demand and management is fairly predictable and follows hourly, daily, weekly, and monthly cycles, complex schemes to flatten load demand may not always be necessary in order to assist in grid optimization. A variety of means may be used to predict a load curve for a region. This prediction can be based on historical data and applied as a static "rule" year over year, or it can be adjusted with arbitrary frequency, using environmental sensor data and calculation methods that are site-based or remote. The load curve and peak demand are a function of many variables, but a primary contributor is ambient temperature, as it drives A/C usage, as well as the efficiency of generation, transmission, and distribution assets. The alignment of peak demand for electricity, with temperature, is inherent, and largely predictable, especially by region and season.

Peak values in the daily load curve drive the greatest inefficiency in the EPG. Whereas numerous technologies are being deployed to address this variability (e.g., "Smart Grid", renewables, storage, real-time pricing, and introduction of new building codes [California Title 24, TDV approach, etc.] and the like), many solutions are not well accepted, commercially viable or well funded.

The Smart Grid is unique among these technologies as it represents a layer of intelligence, designed in part to improve overall efficiency through the optimized use of connected assets. These may include generation assets, end-use load assets (such as refrigerators, hybrid cars, or televisions), storage assets (such as batteries, water heaters, or thermal storage devices), or demand response for load curtailment. Title XIII of the Energy Independence and Security Act of 2007 states the following:

"It is the policy of the United States to support the modernization of the Nation's electricity transmission and distribution system to maintain a reliable and secure electricity infrastructure that can meet future demand growth and to achieve each of the following, which together characterize a Smart Grid:
(1) Increased use of digital information and controls technology to improve reliability, security, and efficiency of the electric grid.
(2) Dynamic optimization of grid operations and resources, with full cyber-security.
(3) Deployment and integration of distributed resources and generation, including renewable resources.
(4) Development and incorporation of demand response, demand-side resources, and energy-efficiency resources.
(5) Deployment of "smart" technologies (real-time, automated, interactive technologies that optimize the physical operation of appliances and consumer devices) for metering, communications concerning grid operations and status, and distribution automation.
(6) Integration of "smart" appliances and consumer devices.
(7) Deployment and integration of advanced electricity storage and peak-shaving technologies, including plug-in electric and hybrid electric vehicles, and thermal-storage air conditioning.
(8) Provision to consumers of timely information and control options.
(9) Development of standards for communication and interoperability of appliances and equipment connected to the electric grid, including the infrastructure serving the grid.
(10) Identification and lowering of unreasonable or unnecessary barriers to adoption of smart grid technologies, practices, and services."

Thus, the general approach is to provide the necessary data models, communication means, and algorithms for centralized or distributed intelligence to enable dynamic control by the utility, or on their behalf. But there are many challenges in doing so:
i. The level of infrastructure required to build out is enormous and will take time.
ii. The control algorithms for real-time control of potentially millions of assets is difficult, due to bandwidth, lack of predictable behavior on end-use, managing end-use restrictions or constraints, and an overwhelming amount of data, to name a few.
iii. The potential contribution from small devices is too small to warrant communication overhead, yet these smaller assets represent the bulk of energy usage.
iv. The potential individual contribution from small devices cannot individually match or adhere to the longer timeframe of influence required to address on-peak or off-peak grid issues.

Millions of end-use assets being added to the utility, communicating the details of grid condition and general trends (especially those based on historical daily ambient temperature) provide meaningful guidance of how to improve energy consumption patterns to improve fuel, emissions, congestion, and cost. A complementary approach to Smart Grid is for individual assets to behave autonomously, shift peak load to off-peak, or reduce peak demand inherently. This is exemplified in the embodiment of FIG. 1.

As the combined behavior of multiple assets are analyzed, the random alignment of demand peaks average out, making kilowatt KW [demand] and kilowatt-hour (KWH) [energy] load shapes look remarkably similar at the aggregated (e.g., substation 108) level. This effect, known as "diversity factor", allows devices to level demand at an end-user 114 without denying service. For example, by coordination of compressor cycling for air conditioning, one can effectively impact the energy bill for an end-user 114 by lowering demand charges, but this has no value to the utility; the energy over even a short time period, when averaged into that of adjacent buildings, remains unaffected. The KW (demand) variations are invisible regardless, and the energy by definition is unchanged. (In fact, the energy might increase if the overall effectiveness of the A/C is reduced by this management style, and most certainly the utility is negatively affected by the loss of revenue with no corresponding change in system demand).

The embodiment of FIG. 1 provides a novel approach to addressing the above issues with SDC by delivering a productive autonomous behavior of end-user 114 assets (e.g., cooling based TES appliances 116 and heating based TES appliances 118). This is made possible because ambient temperature is the primary predictor of summer energy demand for utility forecasting, the aforementioned shape of KW and KWH converge, due to diversity factor, and the ability to address the peak energy problem by flattening the curve through any means (Smart Grid and active control not being inherently required). Seasonal and regional average electricity loads are a strong predictor for daily load variations. While a real-time signal can certainly indicate the precise timing or cost of the moment of peak load, the general shape of the peak is routine, and if more assets were not pulling load during peak, the urgency of the utility industry's problem would be mitigated. Thus, by inverting a standard load curve based upon historical temperature data, meaning consuming the least amount of energy during the hottest summer time periods, grid efficiency would be profoundly improved.

Conventional site assets that can independently invert (or offset) load shape on their own would be highly beneficial. Appliances, such as described in the embodiment of FIG. 1, incorporate energy storage with a control methodology that takes advantage of these facts in a novel manner. By combining the individual contributions of a plurality of small assets, each of which provides a miniscule increase in load flattening, a grand system may be realized, which substantially improves the efficiency of the grid without impact to the end-user, and without the complexity and cost overhead realized with real-time communications or Smart Grid.

An offset electric load curve shape, which is simply the inverted wave form, is easily predicted based upon historical data. A control strategy for a particular geographic region of interest may be introduced with autonomous controllers 148, each with a specific and minute contribution of "off time" to the overall optimization effect. That time may be identified by a 24-hour clock, with the contribution from each asset being relatively very small to the overall desired offset load shape. That time may also be identified as a time offset (e.g., in seconds before or after) relative to some reference point. In this embodiment, each asset (e.g., appliances 130-144) may be individually programmed with an offset scheme which may be irregular or of varying magnitude and duration. However, the open-loop distribution of start times relative to a clock or some reference point causes the net cumulative offset contribution to approximate the desired offset load curve. Working in this manner, the KW contribution for each asset is essentially irrelevant, as the aggregated upstream impact is averaged out as KWH. The nature of each contribution being small also makes the duration, magnitude and shape irrelevant, as these all average out over a large deployment of assets. For example, if the afternoon peak is predicted for 2:00 PM, then the greatest number of appliance offset start times (downtime or minimized AC Power draw) would be assigned to 2:00 PM, with fewer starting 1:59 or 2:02, fewer still 1.54 or 2:05, and fewer still 12:03 or 3:42, etc. . . . the distribution of times, not necessarily symmetrical around 2:00 PM, are allocated according to the desired offset load shape. Additional performance factors may also be utilized, such as manufacturer, type of asset, or asset features, where these alternate considerations are not fundamental to the concept, but can improve the accuracy of the actual delivered cumulated shape. This "downtime" or offset may be set by a fixed schedule that may be incorporated into a lookup table programmed into a small microprocessor within the controller 148 or the times may be set by a schedule that varies by day of the week, month, season or other factor relevant to the performance of the EPG.

The offset start times may also be established relative to a reference point that can be determined locally by each asset but without requiring a communications link. This would allow the shape of the curve to be set once, for example, at a factory or distribution point, while the individual assets adjust by continually estimating the reference point. This feature eliminates the need for a synchronized clock or communication. As an example, the time settings might be set relative to the expected summer afternoon peak time; using the values from above, the offset to an example reference point of 2:00 PM may be −1, +2, −6, +5, −117, +102 minutes respectively. But the reference point of 2:00 PM could be preset or determined by the asset by using a local variable that serves as a course estimate or proxy for afternoon peak load. For instance, the controller 148 could monitor ambient temperature, and by applying a low pass filter to what it determines is daily peak time as detected locally, its reference clock could be allowed to have a low inherent accuracy, but with a constant or regular self-correcting aspect.

In this example, the "peak ambient reference+3 minutes" might be the asset's setting, and the time of peak ambient is based on the individual asset's own determination of when peak will be, based upon a preset, real-time or historically determined variable. Other reference points could be used, such as the coolest time of the 24 hour day, the hottest time of the 24 hour day, a ratio of hottest to coolest time of the 24 hour day, a perceptible change in input electricity condition (e.g., voltage, power, frequency, power factor of the electrical energy supply to the building, or the like) or any other variable accessible to the controller 148. The power factor, for example, shows a cyclic lag/lead that can be measured, and is highly correlated with the load on the grid on a daily basis. Seasonal adjustments can also be defined is such a way where the pattern of coldest time of a day, as an example, can be used to pinpoint latitude and time of day, and improved further when used in conjunction with other measurements. Furthermore, seasonal adjustments may include alteration of the offset times, to create a wider or narrower response around the reference point. In another example, a midsummer value of +6 minutes might reduce to +4 minutes in a shoulder month. These variables, including location or climate zone changes, may be managed with an input from the end-user 114, for instance, with the simple input of a zip code or area code, or be inferred from the behavior of available local environmental sensors. The reference point can also be communicated via a world clock RF signal, or comparable means. The reference point could also be determined by a second apparatus, as an example, a temperature sensor mounted outside a house, yet in communication with the appliance's controller by any method. This design would still be consistent with the scope of the invention that does not require smart grid communications. The reference point may also be explicitly enunciated periodically by an external or remote signal, smart grid or otherwise. The load offset shape would still be statistically distributed by the grid controller in the appliance, but around a reference point (as distinguished from a triggering signal) provided by an external or remote means.

These methods of local grid load determination may have considerable error for latitude or time, but are relatively inconsequential in the grand scheme for several reasons. First, the error averages out over multiple assets. Second, since the summer EPG load is inherently correlated with ambient temperature, the alignment will generally favor an optimal right load offset, potentially even more accurately than a synchronized clock. The distributions of start times of the offset for local assets, and a local determination of reference point for maximum EPG load, have independent impact on grid optimization. An embodiment which incorporates each of these techniques used in conjunction, allows the manufacturer of an asset to prescribe a statistically determined offset to a locally determined daily reference point, where that reference point stands as a proxy for peak load or other grid attribute of interest, and the statistics of the distribution are designed to allow the cumulative contribution of all assets to create a desired offset load shape. This provides benefit for both on-peak (nominally to reduce load) and for off-peak (nominally to increase load).

Thus, the control methodology for SDC can be effectively used to level the load on the electric grid, without the need for smart grid infrastructure, communications, local programming, local control systems or additional overhead. Additional features of the smart grid, communications, or local control systems can be added to provide fine tuning on daily load forecast curves, synchronizing clocks, etc. However, these are aspects not required for functionality. In the embodiment disclosed in FIG. 1, the controller 148 provides local impact of the asset's load offset, which may be both short in duration, and low in magnitude, which facilitates little or no negative impact to the end-user 114 energy bill. The impact is predominantly grid-related, and the optimization (power distribution curve shape) may be prescribed for optimization by the local utility.

As a further example, the weather for a particular region where a central power generation 102 facility is operating, may be well known, easily predicted and unlikely to change significantly over time. Historical weather patterns and EPG load curves for a particular zip code (or multitude of zip codes sharing similar characteristics) may be preprogrammed into the TES controller 148 for periodic switching to a stored energy state, when electrical power grid has historically been under stress due to the utilization of commercial and residential demand between the hours of noon and 6:00 PM. In response to this predicted demand, a plurality of TES controllers 148 begins to systematically switch the TES appliances 116-118 to a lower power draw state, thereby reducing electricity demand assist and offsetting this potentially detrimental situation. This controller 148, located on the downstream side of the power meter, facilitates the utilization of the stored energy and manages the optimal timing for producing and delivering the stored energy to the end-user 114. Peak demand can be reduced significantly on the central power generation 102 in a way that the end-user 114 does not realize an interruption or change in service at the point of consumption of the energy. This model demonstrates a utility driven, disaggregated, distributed energy storage system, where the distributed energy resource is designed to behave as an offset to the predictable daily electrical demand profile, and then generate a multitude of independent responses to this demand in order to optimize the performance of the entire system of generation, transmission, distribution of power.

To further exemplify the magnitude of the cumulative effect of this system and method, the cooling based TES appliances 116 of FIG. 1 typically draw electric power in a 1 hour period of time according to the following: central air conditioner 130 –3.5 KW; refrigerator/freezer 132 –0.5 KW; deep storage freezer 134 –0.4 KW; vending machine 136 –0.4 KW, water cooler 138 –0.2 KW; for a total cooling power consumption of 5 KW per hour. Heating based TES appliances 118 of FIG. 1 typically draw electric power in a 1 hour period of time, according to the following: conventional oven 140 –2 KW; hot water heater 142 –3.5 KW; furnace/heater –10 KW; and, clothes dryer –4 KW; for a total heating power consumption of 19.5 KW per hour. TVs, game systems, dishwashers, computers, stereos, and other electronic devices, possibly used in conjunction with battery-based electrical storage, all vary in their frequency of use, load shapes, etc.

However, a battery, having well-defined storage attributes, can still be configured at any point (at manufacture, at distribution, at installation, etc) to subscribe to the statistical control means described by this application, thereby adding these traditional assets to serve as contributing elements of the solution. Assuming that an average end-user 114 may be utilizing only a portion of these appliances at any one time during a peak EPG load timing, it could be argued that anywhere from 2-5 KW could be removed from the grid, due to the offset of storage within the appliances. Taking the example of San Diego Gas & Electric, the utility that provides natural gas and electricity to San Diego County and southern Orange County in southwestern California, with 3.3 million consumers, a 1.2% customer base using appliances and controllers as detailed in the embodiment of FIG. 1, could shift 200 megawatts of their peak demand for every hour of storage offset. In another example, if just 10% of the 125 million refrigerators in the U.S. contained the TES and controller of the embodiment of FIG. 1, 630 megawatts of electricity per hour could be shifted to periods of low demand. Statistical distribution control may even be utilized with assets that do not have inherent dedicated energy storage. For instance, a water cooler may not have a separate thermal or battery storage module incorporated into the appliance, but a cessation of AC power for a short 5-15 minute period may not be noticeable or intrusive to the end-user 114, and therefore becomes a viable option for a load negating asset. Thus, another benefit of the statistical nature of this type of distribution control, is that many devices may be taken off the grid for very short random time periods, which may go completely unnoticed by the end-user 114.

Figure 2:
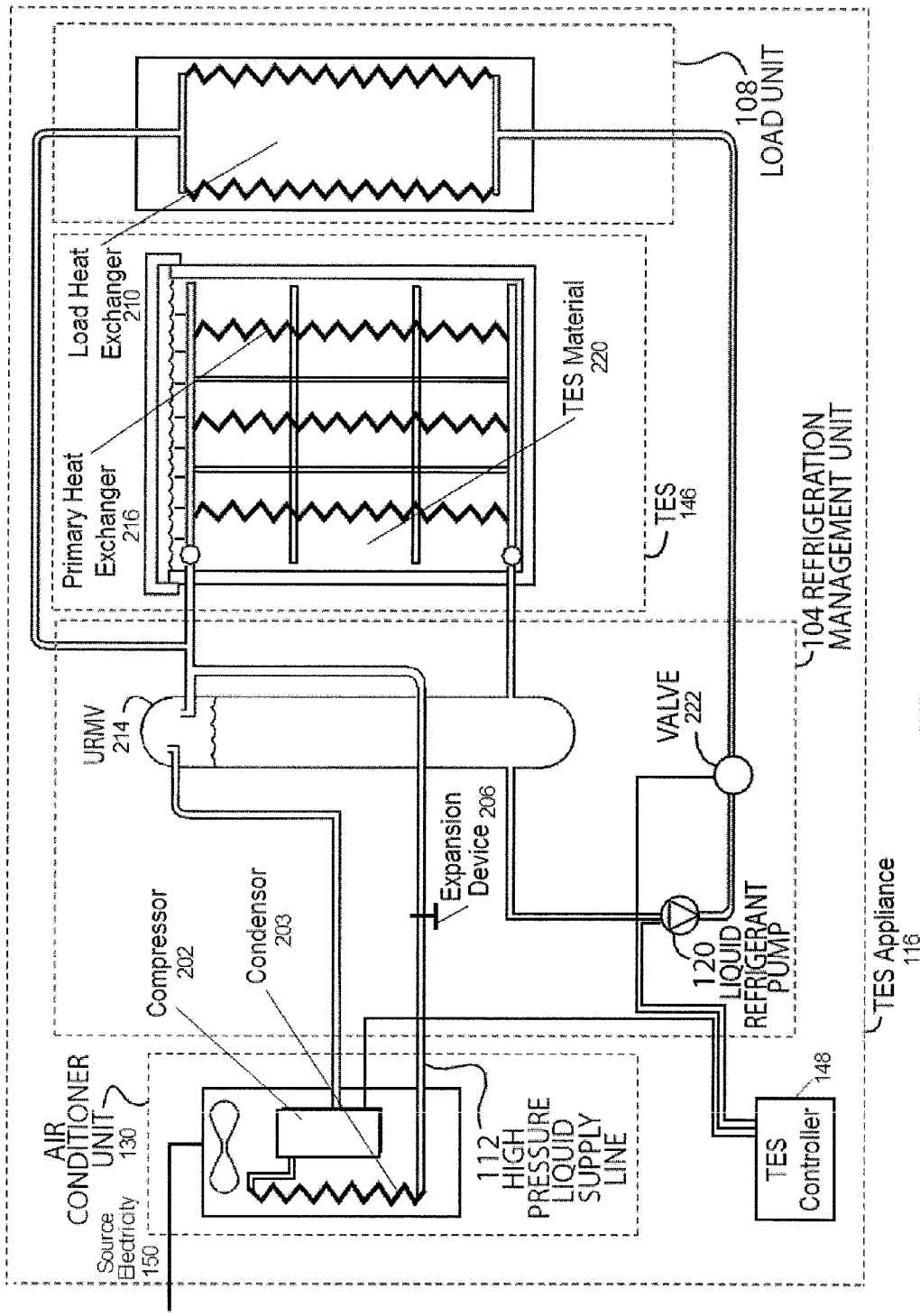
FIG. 2 illustrates a configuration of an embodiment of an air conditioner with integrated TES that is controlled so as to shift electric load away from periods of peak demand of an electric power grid.

FIG. 2 illustrates a configuration of an embodiment of an air conditioner with integrated TES that is controlled so as to shift electric load away from periods of peak demand of an electric power grid. As shown in FIG. 2, the cooling based TES appliance 116 (in this case an air conditioner 130) receives source energy 150 at the end-user 114 site and provides cooling for the dwelling. When in operation, the air conditioner 130 would typically draw electric energy at the rate of 3-5 KW and would see highest demand for use in the 2:00-6:00 PM time range (hottest time of day). The air conditioner unit 130 may be a conventional condensing unit that utilizes a compressor 202 and a condenser 203 to produce high-pressure liquid refrigerant delivered through a high-pressure liquid supply line 112 to the refrigeration management unit 104. The refrigeration management unit 104 is connected to an energy storage unit 146 typically comprising an insulated tank with ice-making coils (primary heat exchanger 216) and is filled with a phase change liquid such as water or other eutectic material. The condenser and compressor 152, the refrigeration management unit 104 and the TES 146 act in concert (statistical coordination) to provide efficient cooling to the load heat exchanger 210 (indoor cooling coil assembly) and thereby perform the functions of the principal modes of operation of the system.

As further illustrated in FIG. 2, the compressor 202 produces high-pressure liquid refrigerant delivered through a high-pressure liquid supply line 112 to the expansion device 206 in the refrigeration management unit 104. The high-pressure liquid supply line 112 feeds a universal refrigerant management vessel (URMV) 214, which supplies liquid refrigerant to a liquid refrigerant pump 120 and directly to the load unit 108 when valve 222 is actuated. When activated, a liquid refrigerant pump 120 supplies the evaporator coils of the load heat exchanger 210 with liquid refrigerant. Low-pressure refrigerant returns from the evaporator coils of the load heat exchanger 210, via wet suction return, back to the URMV 146 and to the primary exchanger 216, composed of ice freezing/discharging coils. The low-pressure vapor exits from the top of the URMV 214 and returns to the compressor through a dry suction return line.

The insulated tank, in this example, contains dual-purpose ice freezing/discharging coils as the primary heat exchanger 216 (nominally geometrically designed helical coils), arranged for gravity circulation and drainage of liquid refrigerant, and is connected to an upper header assembly at the top, and to a lower header assembly at the bottom. The upper header assembly extends outward through the insulated tank to the refrigeration management unit 104. When refrigerant flows through the primary heat exchanger 216 and header assemblies, the coils act as an evaporator, and the TES material 220 (in this example water) solidifies in the insulated tank during one time period (non-peak EPG, i.e., night). The primary heat exchanger 216 and header assemblies are connected to the low-pressure side of the refrigerant circuitry and are arranged for gravity or pumped circulation and drainage of liquid refrigerant. During a second time period (peak EPG demand, i.e., mid to late afternoon), warm vapor phase refrigerant circulates through the ice freezing/discharging coils and melts the ice, providing a refrigerant condensing function.

In summary, when the tank is filled with water and refrigerant is circulated through the coils, the coils act as an evaporator, forming ice and storing energy during one time period. During a second time period, refrigerant circulates through the coils and melts the ice, providing a refrigerant condensing function. This energy storage and discharge methodology is known as ice-on-coil, inside-melt. The system is controlled by the TES controller 148, which uses preprogrammed time periods, which are easily predicted to serve useful time periods, and unlikely to change significantly over time. Operating patterns may be preprogrammed into the TES controller 148 for periodic switching to the stored energy state when the EPG has historically been under stress due to the utilization of commercial and residential demand between the hours of noon and 6:00 PM. In this manner, the TES controllers 148 switch to a lower power draw state thereby reducing electricity demand to assist in offsetting potentially detrimental excessive load on the EPG. This controller 148, connected to the compressor 202, the liquid refrigerant pump 120 and the valve 222, manage the optimal timing for producing and delivering the stored energy to the end-user 114 without removing or reducing the performance of the appliance 116. In this way, the end-user 114 does not realize an interruption or change in power at the point of consumption of the energy. This model demonstrates a single appliance application of a utility driven, disaggregated, distributed energy storage system where the distributed energy resource is designed to behave as an offset to the predictable daily electrical demand profile, and then generate a multitude of independent responses to this demand in order to optimize the performance of the entire system of generation, transmission, distribution of power. However, this asset has a large enough storage capacity (or demand management impact duration) as to be able to serve the entire predicted on-peak period. Much smaller assets cannot individually provide such service, yet can act in a statistically arranged deployment with other such devices to provide any arbitrary load shape desired.

In this particular embodiment, the normal power draw from a typical unitary air conditioner is shifted from 3.5-5 KW (under full condenser 203 and compressor 202 operation) to around 300 W, when just the pump 120 and air handler (not shown) are in operation. Thus, a net reduction of 3.2-4.7 KW is realized with a single appliance 116. The time of this reduction may last anywhere from 1-4 hours depending on the capacity of the TES 146. Alone, this reduction is negligible to the overall performance of the EPG, but the net cumulative effect of tens of thousands of these appliances 116, can provide a significant reduction (e.g., hundreds of MW) in the power draw of a community or utility district.

The disclosed embodiment provides an efficient refrigeration apparatus that provides refrigerant-based thermal energy storage and cooling. When connected to a condensing unit, the system has the ability to store energy capacity during one time period and provide cooling from the stored energy during a second time period. The system requires minimal energy to operate during either time period, and only a fraction of the energy required to operate the system during the first time period is required to operate the system during the second time period using an optional refrigerant pump.

Figure 3:
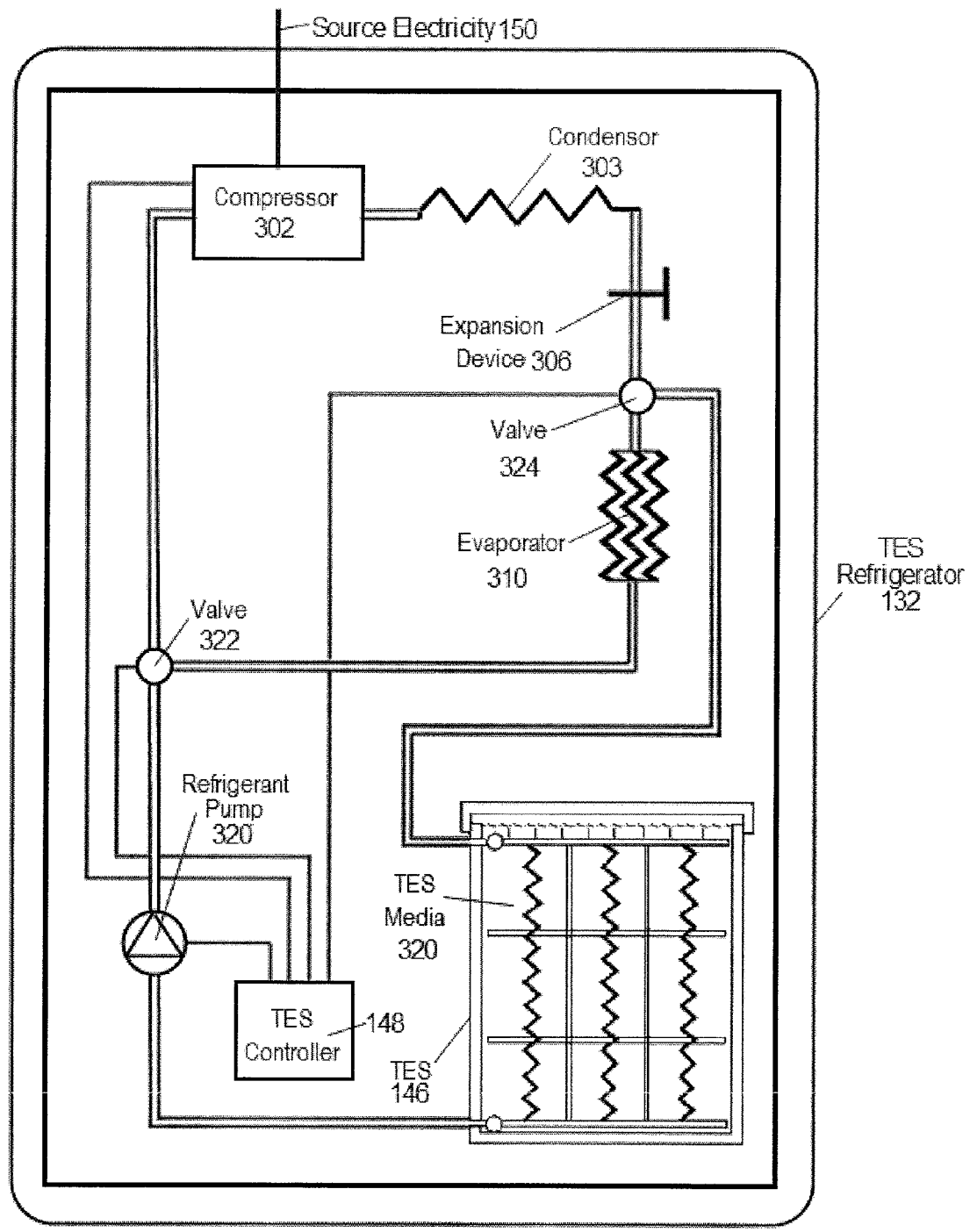
FIG. 3 illustrates a configuration of an embodiment of a refrigerator with integrated TES that is controlled so as to shift electric load away from periods of peak demand of an electric power grid.

FIG. 3 illustrates a configuration of an embodiment of a refrigerator with integrated TES that is controlled, so as to shift electric load away from periods of peak demand of an electric power grid. Similar to the TES air conditioner described in FIG. 2, the TES refrigerator utilizes an integrated TES 146 unit with TES media 320 used to store thermal energy in the form of a cold single phase or phase change material. As with the above described air conditioner 130, a compressor 302, being supplied with source electricity 150 at the end-user 114 site, compresses and condenses a refrigerant with condenser 303 and then uses the expansion device 306 to expand the refrigerant in the evaporator 310 (operation mode) or in the TES (charge mode) through the operation of valve 324. Once the TES 146 is charged, the TES refrigerator appliance 132 may be used in discharge mode, by using the cooling stored in the TES media 320 to condense the refrigerant and cycle it through the evaporator 310 using valve 322 and driven by refrigerant pump 320. As was the case in the embodiment of FIG. 2, the TES controller 148, connected to the compressor 302, liquid refrigerant pump 320, the valves 322 and 326, manage the optimal timing for producing and delivering the stored energy to the end-user 114 without removing or reducing the performance of the appliance 132. In this way, the end-user 114 does not realize an interruption or change in power at the point of consumption of the energy.

Figure 4:
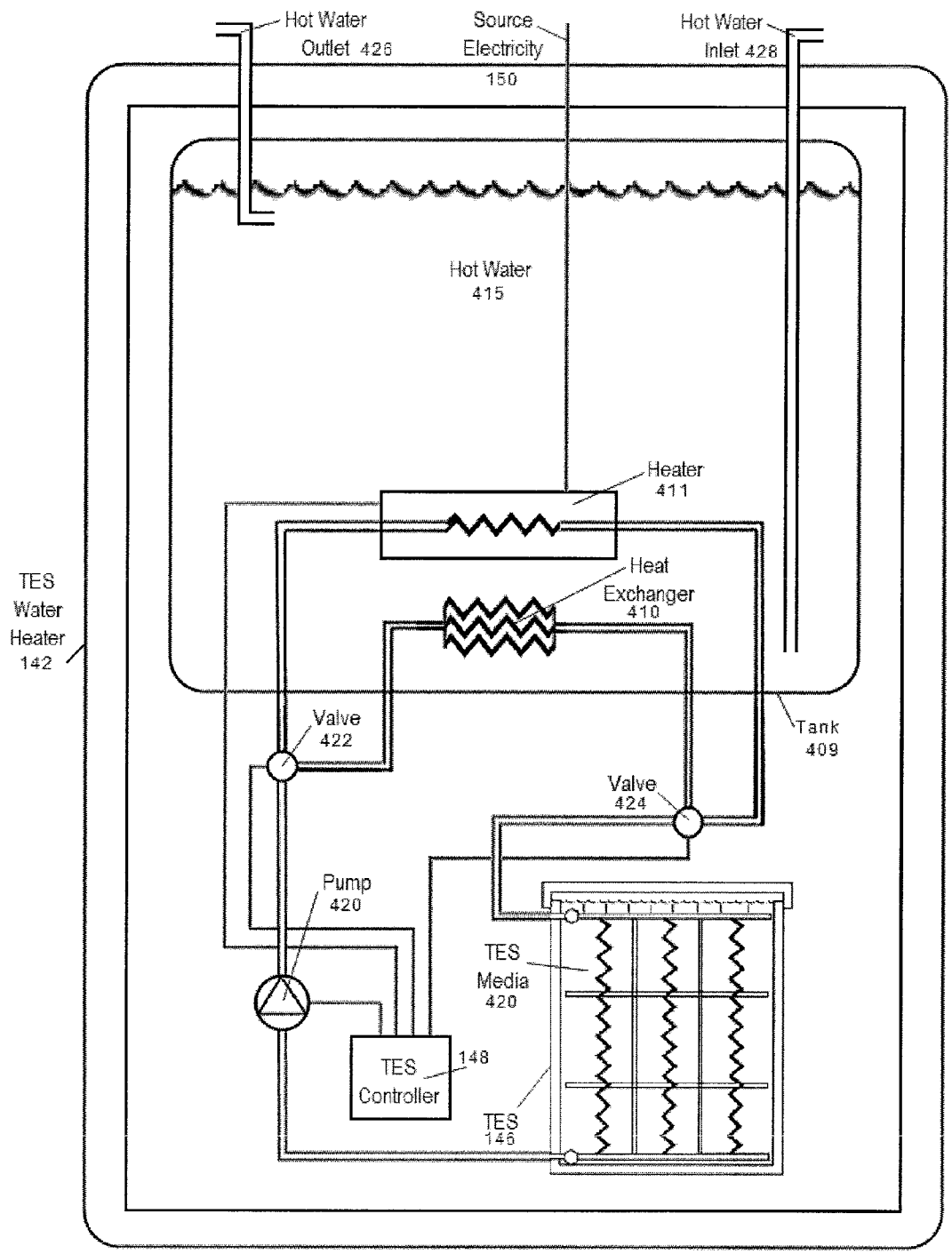
FIG. 4 illustrates a configuration of an embodiment of a hot water heater with integrated TES that is controlled so as to shift electric load away from periods of peak demand of an electric power grid.

FIG. 4 illustrates a configuration of an embodiment of a hot water heater with integrated TES that is controlled, so as to shift electric load away from periods of peak demand of an electric power grid. FIG. 4 shows an embodiment of a heating based appliance 116 with integrated TES that is controlled so as to shift electric load away from periods of peak demand of an electric power grid. Similar to the cool based TES appliances described above, the TES hot water heater 142 utilizes an integrated TES 146 unit with TES media 420 used to store thermal energy in the form of a hot, single phase or phase change material. In this embodiment, a heater 411, being supplied with source electricity 150 at the end-user 114 site, heats the hot water 415 in tank 409, as in a conventional hot water heater, but also utilizes heater 411 to heat a heat transfer material to the TES 146 via valve 422 and pump 120 and returns via valve 424. Once the TES 146 is charged, the TES water heater appliance 142 may be used in discharge mode by using the heat stored in the TES media 420. When in charge mode, the heater 411 transfers heat to the TES media 420. When discharging during the offset period, the heat is transferred from the TES media 420 to the heat exchanger 410 via valve 424. The heat exchanger 410 transfers heat from the heat transfer material to the hot water and is recirculated back to the TES 146 via valve 422 and pump 120. As was the case in the cooling based TES appliances 116, the TES controller 148 connected to the heater 411, pump 120 and the valves 422 and 424, manage the optimal timing for producing and delivering the stored energy to the end-user 114, without removing or reducing the performance of the appliance 142. In this way, the end-user 114 does not realize an interruption or change in power at the point of consumption of the energy.

Figure 5:
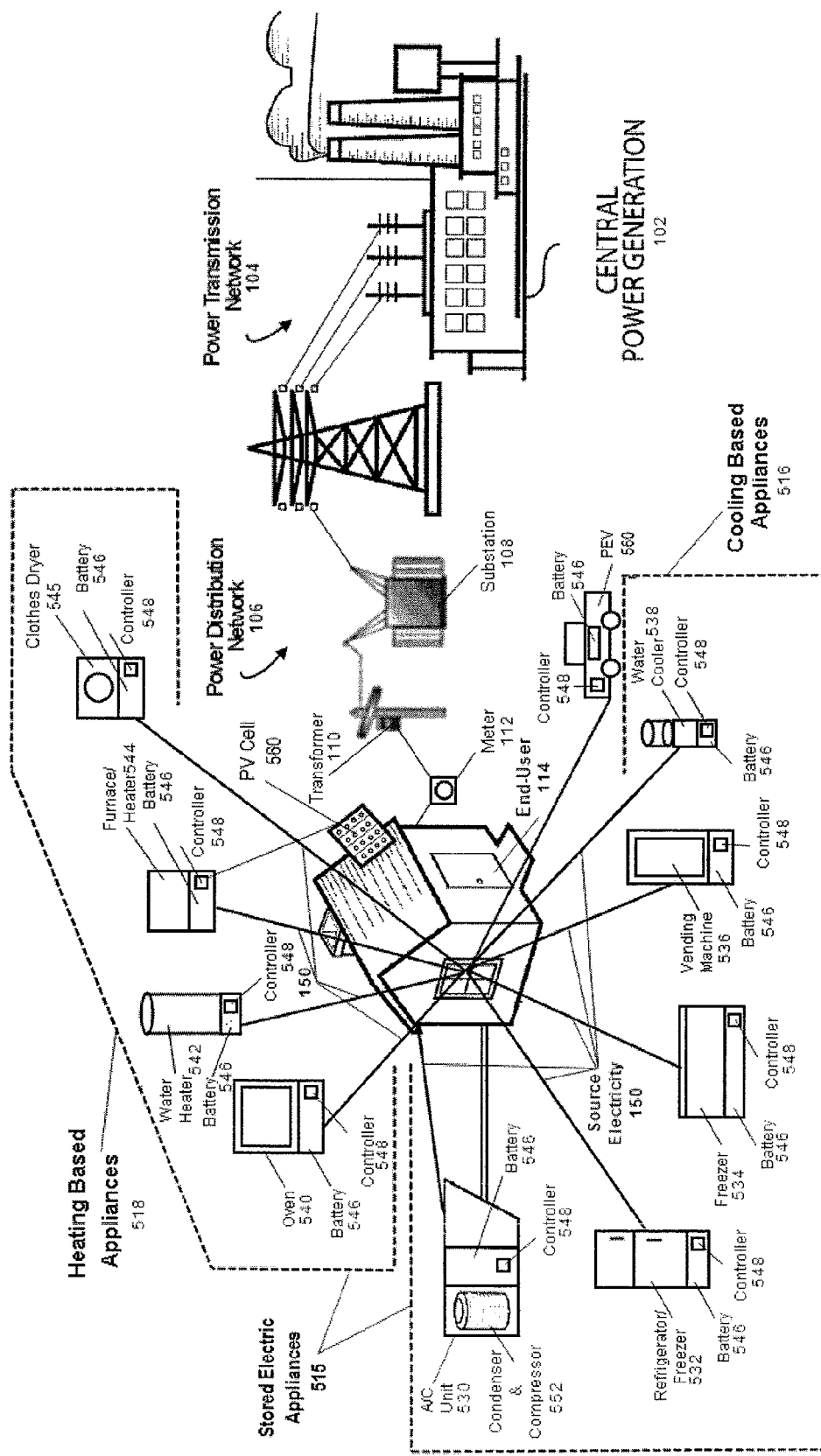
FIG. 5 illustrates another embodiment of a dwelling where a plurality of appliances are controlled so as to shift electric load away from periods of peak demand of an electric power grid to the end-user of the appliance.

FIG. 5 illustrates another embodiment of an optimized dwelling where a plurality of appliances are controlled so as to shift electric load away from periods of peak demand of an electric power grid without disruption of service to the end-user of the appliance. As shown in FIG. 5, an embodiment of a grid level power generation and distribution system with on-site energy storage (battery) and power input to a single user is depicted. As with the embodiment of FIG. 1, electricity from the central power generation 102 is delivered to the end-user 114 via the utility managed power transmission network 104 and the utility managed power distribution network 106. The power is delivered through the power meter 112 at the end-users site after being stepped down at the substation 108 and transformer 110. In this example, a variety of electric devices (stored electric appliances 515) that may utilize energy storage (in this embodiment a battery 546), are individually controlled with a controller 548. In this example, cold-based appliances 516, such as an air conditioner unit 530, a refrigerator/freezer 532, a deep storage freezer 534, a refrigerated vending machine 536, a water cooler 538, or any other device utilizing cooling below ambient temperature, is connected to the source electricity 150 and draws power from the grid as needed. Additionally, FIG. 5 depicts a variety of heat-based electric devices (appliances) that may utilize energy storage (in this embodiment battery 546 storage) and are individually controlled with a controller 548. The cumulative effect of these devices may or may not mimic the overall desired "inverted" load shape, intended to be achieved by a deployment of a large number of such appliances; yet when viewed in sufficient numbers, that desired load shape will emerge.

In this example, heat-based appliances 516 such as an oven 540, a water heater 542, a furnace or space heater 544, a clothes dryer 552 or any other device utilizing heating above ambient temperature, is connected to the source electricity 150 and draws power from the grid as needed. Each appliance 516, 518 is equipped with a battery 546, which is used to provide energy storage to the end-user 114 by supplementing and or replacing the cooling or heating supplied to the appliance by real time grid power. In this example, the appliance is located within, or in proximity to, the end-user 114 and are supplied with power from the dwelling by on-site power supply lines, although either or both of these devices may receive power from any other source such as the central power generation 102, distributed energy resources, site generation or the like.

As with TES appliances 116-118 responding to a predicted demand, a plurality of controllers 548 begins to systematically switch the appliances 516-518 to a lower power draw state, thereby reducing electricity demand and assist in offsetting this potentially detrimental situation. This controller 548, located on the downstream side of the power meter, facilitates the utilization of the stored energy, and managing the optimal timing for producing and delivering the stored energy to the end-user 114, peak demand can be reduced significantly on the central power generation 102, in a way that the end-user 114 does not realize an interruption or change in power at the point of consumption of the energy. This model demonstrates a utility driven, disaggregated distributed energy storage system where the distributed energy resource is designed to behave as an offset to the predictable daily electrical demand profile, and then generate a multitude of independent responses or this demand in order to optimize the performance of the entire system of generation, transmission, distribution of power.

Typically, all the battery storage appliances will incorporate conventional and well known methods for ways in which to handle the battery charging and discharging, as well as either the conversion back to alternating current, or have dual power AC/DC heaters/coolers. Additionally, any type of electric storage battery 546 may be utilized in the scope of the disclosed embodiments, such as lead-acid, nickel-cadmium, lithium or the like. Additional means of energy storage, such as chemical or mechanical (e.g., flywheel, compressed gas or the like), may also be utilized within the scope of the disclosed embodiments.

It is also within the scope of the disclosed embodiments that batteries 546 or TES 146 may additionally be charged by electricity other than that generated by the central power generation 102. For instance, solar or wind generated power may be input into the storage means 146, 546 to charge (or discharge) the appliance in a manner which further decreases (or increases) the draw on the EPG. For example, a small photovoltaic cell 560 may be placed on the outside of the end-user 114 dwelling that generates a small (e.g., 100 W) trickle charge, which would charge a battery or TES throughout the day and allow the appliance 116, 118, 516, 518 to power down and offset for a short period of time, possibly as little as a few minutes. This is because the cumulative aggregation of tens of thousands or millions of appliances allows tremendous variability in the type, amount, and duration of the offset, while still providing a substantial benefit that is statistically averaged to maximize EGP performance on a grand scale.

Figure 6:
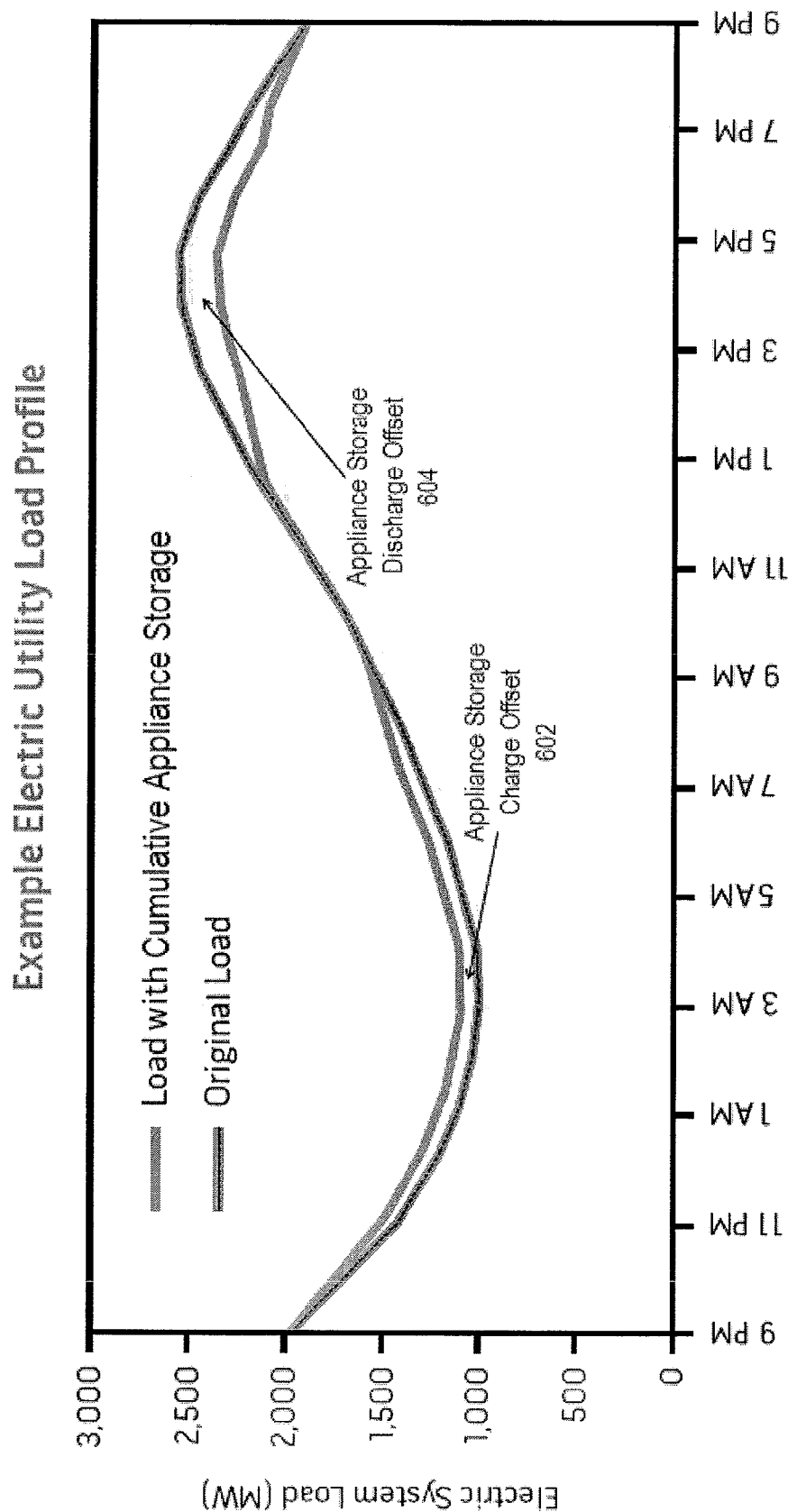
FIG. 6 is an exemplary graphical depiction of a typical electric utility load profile with an overlay of the same load profile with the influence of electrical offset appliances.

FIG. 6 is an exemplary graphical depiction of a typical electric utility load profile with an overlay of the same load profile with the influence of electrical offset appliances. As shown if FIG. 6, a typical electric utility load profile is depicted for a single 24-hour time period. This load follows a typical sine wave, which is driven by activity and temperature with the peak power demand being in the 2:00-6:00 PM range. The embodiments of the present application reduce peak energy demand by shifting a portion of the energy usage of energy storage appliances to off-peak and storing energy at night or during periods of low EPG activity when electricity generation is cleaner, more efficient, and less expensive. This allows the plurality of appliances to deliver that energy during the peak of the day to provide a reduction of demand by the end-user 114. In some cases, the energy demand from storage appliances may be a 95-100% reduction from the nominal appliance draw. When aggregated and deployed at scale, the cumulative effect is substantial, improves the efficiency and reliability, thereby enabling a cleaner, smarter and more sustainable power grid.

Overlaying the electric utility load profile for the same 24-hour time period, it is readily shown that the net cumulative reduction in electricity demand for a 200 MW deployment of storage appliances, may be controlled to match the easily predicted peak demand load profile. Thus, the peak load curve for the EPG is significantly reduced at its most critical and vulnerable time shown as the appliance storage discharge offset 604, and this load is shifted to a period when generation is least stressed and when electricity is often in surplus shown as the appliance storage charge offset 602. The net effect of this technology normalizes the extreme fluctuations by both reducing demand during the peak, and also by transferring this load to the valley. This allows the central power generation 102 to maintain a steadier, more predictable output to the EPG with lower cost, lower emission generation assets. This technology particularly benefits regions where wind energy is primarily driven at night. Utilities benefit from a distributed resource that helps offset the need for peak generation, relieves transmission congestion, firms up renewable sources of energy and reduces emissions. The end-user 114 (businesses, residences and buildings where the controlled storage units are installed) benefits from lower daytime energy consumption, increased efficiency, lower energy costs, a smaller environmental footprint, and improved comfort.

Figure 7:
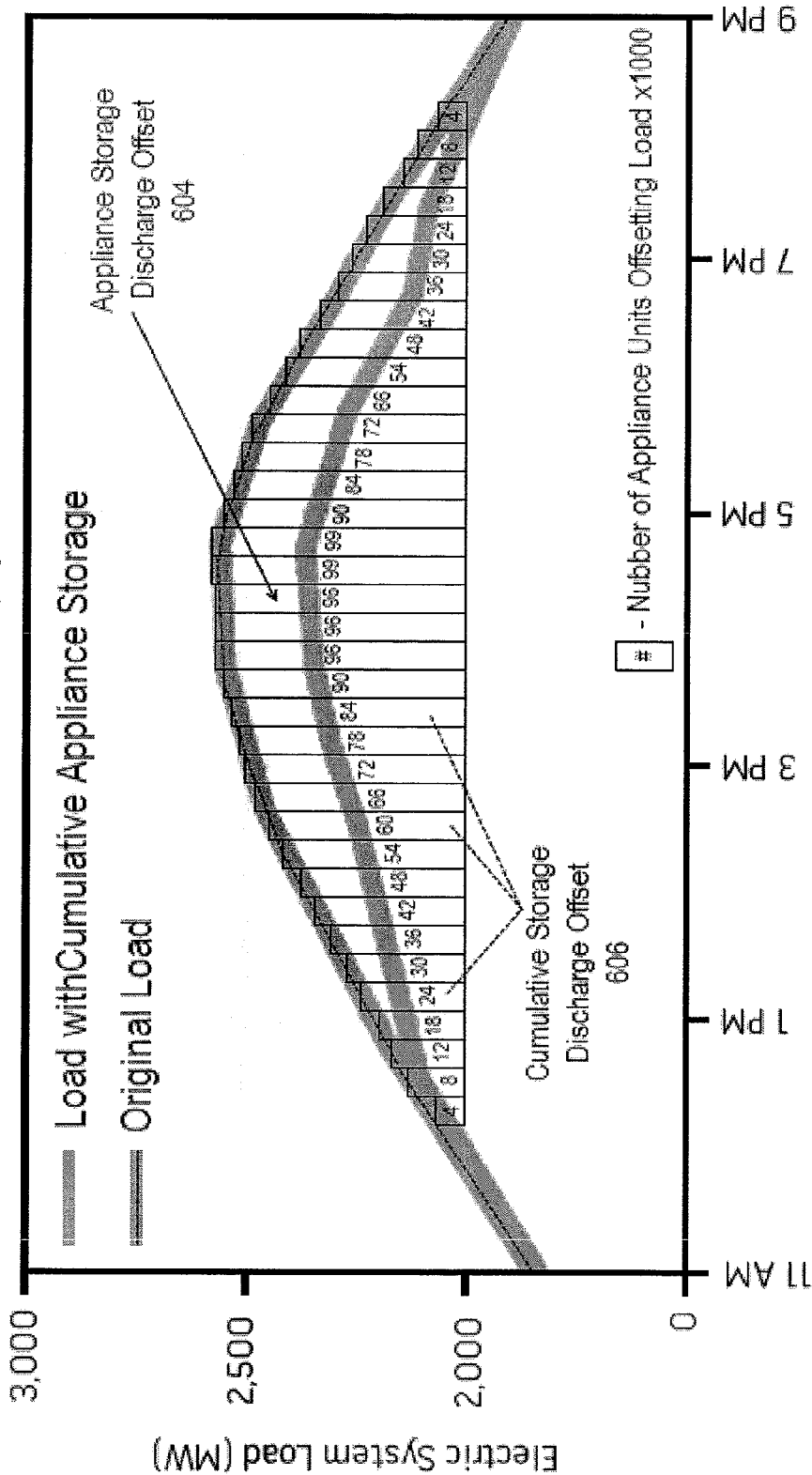
FIG. 7 illustrates an exemplary graphical depiction of a typical electric utility load profile with an overlay of the same load profile with the influence of electrical offset appliances.

FIG. 7 is an exemplary graphical depiction of the peak load portion of the electric utility load profile shown in FIG. 6, including the overlay of the same load profile with the influence of electrical offset appliances. This figure highlights the cumulative reduction of peak load (appliance storage discharge offset 604) by a plurality of controlled storage appliances and graphically displays the individual controlled appliance units acting in concert statistically to produce an offset curve that effectively improves anticipated electric power grid conditions thereby accomplishing control by statistical distribution (statistical distribution control). In this example, the cumulative storage discharge offset 606, is divided into time periods of approximately 15 minutes. Whereas the cumulative storage discharge offsets 606 are in 15 minute increments, the period which a particular appliance is utilizing storage to power down (offset) may be any time increment and is typically dependent upon the type and function of the appliance. For instance, a TES water cooler 136 or hot water heater 142 may only have a duty cycle that is 15 minutes per hour, and thus, these units may participate only in a single cumulative storage discharge offset 606 or have time lapses between the active offsets. For instance, a hot water heater 142 with a typical duty cycle of 15 minutes on and 45 minutes off per hour, may utilize storage to offset the on-cycle. The hot water heater 142 may show up within the first cumulative storage discharge offset 606 as well as possibly the $5^{th}$, $9^{th}$, $13^{th}$, $17^{th}$, $21^{st}$, $25^{th}$, $29^{th}$ and $33^{rd}$ offset periods, if the appliance has enough storage capacity. In this manner, a single appliance may have multiple instances of controlled grid influence.

Other appliances that utilize TES, or other energy storage on a larger scale, and for appliances with greater duty cycles, a single unit (i.e., TES air conditioner 130) may utilize offset storage for multiple consecutive cumulative storage discharge offset 606 periods. A TES air conditioner 130, such as depicted in FIG. 2, may be capable of offsetting a 100% duty cycle for a period of 3-6 hours. In this instance, a single TES air conditioner 130 could offset each and every cumulative storage discharge offset 606 period depicted in FIG. 7, which start in this example at approximately 12:00 PM, and continue until approximately 8:15 PM. As shown, the offset initiates with preprogrammed controllers within the end-user 114 site beginning to shift power of the appliance from normal utility electricity to stored energy. In this example, a total of 1,878,000 units within 36 cumulative storage discharge offset 606 periods are utilized to shift approximately 200 MW of peak electric power from the EPG. Starting approximately at noon on any given day, 4000 of the 1,878,000 units (0.21%), initiate a preprogrammed shift to stored energy, which has been stored at periods of low EPG demand during the previous 24-hours. At the second cumulative storage discharge offset 606 period, 8000 units (0.42%) initiate or continue shifting to stored energy, and so on, until at approximately 4:30 PM, nearly 100K appliances (5.3% of all controlled appliances) are being powered with stored energy.

Since this effect is based upon the cumulative nature of a multitude of controlled storage appliances (i.e., the statistical deployment of preset units), a small number of different programs (36 in this example) are utilized in a statistical manner to replicate the offset curve. In this example, 0.21% of the installed controllers 148, 548 program their appliances to shift power to storage, from approximately 12:00 PM to 12:15 PM daily, 0.42% shift from 12:15 PM to 12:30 PM, and 5.3% shift from 4:30 PM to 4:45 PM. As stated above, since some controlled storage appliance applications allow for multiple offset periods, either intermittently or consecutively, conventional statistical averaging can determine the particular programming for a particular appliance. Thus, the individual appliances are controlled by the controller 148, 548 to act in statistical coordination to produce an offset curve that effectively improves anticipated electric power grid conditions. By involving a very large number of end-users 114, a statistically significant number of appliance units can significantly affect electric power grid conditions.

Because the magnitude of the peak load on the EPG is so large in comparison to the individual offset contribution of any single controlled appliance, the offset timing does not demand high accuracy, thereby allowing for preprogramming at the factory or elsewhere. Additional processes to increase accuracy may be implemented with the controller 148, 548, such as utilizing a universal clock signal (i.e., NIST radio station WWVB), average outdoor temperature maximum at the location of the appliance, manual end-user 114 location entry (e.g., zip code, area code address, state etc. . . . ), AC line condition (voltage, current, frequency etc. . . . ) or any other information that would assist the controller 148, 548 in increasing the accuracy of that particular appliance's small part in the overall big picture of EPG optimization. Thus, date, time and season are easily determined and utilized to increase accuracy of the individual units and overall performance of the system. Utilizing rules, tables, algorithms or software that is preprogrammed or easily input with preprogrammed information, significantly decreases the cost and complexity of each controller 148, 548.

With the above disclosed system, a variety of appliance manufacturers could incorporate energy storage into their products with a reasonably priced and straightforward controller 148, 548, that, when combined as a plurality of appliances, would reduce electric system peak demands and future capacity requirements for the utilities, while providing a significant cost savings to the utility through avoidance of generating unit additions or purchased power. A plurality of controlled storage appliance units, operating within an electric system, will produce measurable impacts on the electric utility load shape, clipping peak period loads, filling off-peak valleys and resulting in savings in electric system operating costs, since electric system losses are higher during peak load periods and are lower during off-peak periods. The disclosed embodiments counteract this effect by reducing energy requirements during high loss, on-peak periods and using energy during low-loss, off-peak periods, with the net effect being a reduction in total electric system losses and the system will reduce ancillary service requirements of the electric utility or balancing authority, improving electric system power factor and in turn reducing reactive power requirements. Therefore, appliances and their associated controllers and settings could be used to address not only peak demand, but other grid parameters of interest as well. Furthermore, the solution, being independent of any on-line communications, also improves homeland and grid security by not being part of a communication network.

Additionally, adding the desired statistical distributed load shape to the intelligence of the distributed controller, allows each controller (or all such controllers) to pick a different start time relative to the reference point, with appropriate statistical distribution, on a daily basis. This improves the robustness of the solution, improving the likelihood that the desired load shape is met, on average, for a maximum amount of time, without oversight intervention. Also, it is within the scope of the embodiments that different assets, classes of assets, or application of assets, may have different statistical distribution curves. For example, this would allow residential appliances, that are unlikely to run during the overall peak, to address the residential peak, which has a unique load shape. These load shapes can be defined in coordination with one another, and modified over time without sacrificing the benefits of the installed base. Also, the controller and control algorithm, herein described as statistical distribution control, may be applied to any asset. This includes assets with articulated storage, those with inherent storage attributes, and others without any storage and responding with demand reduction via other means. While the aforementioned examples have focused on on-peak demand reduction, this is not a limitation of the scope of the invention. Apparatus may be equally applied to off-peak time periods and load increase, not just reduction, and may address other attributes of the grid other than, or in addition to, demand. SDC can be used in conjunction with other application-specific controls. For example, Plug-in Electric Vehicle (PEV) 560 charging, while its natural shape may not match the peak load shape or its desired inverse, can still be interrupted or enabled according to the shape desired, in small quantities, thus contributing favorably to the goals and asset base of SDC nonetheless.

Personal computers have built-in storage, and are commonly on-line. As internet connectivity continues to grow, more appliances with built-in storage will be on-line. These appliances can respond uniquely to Demand Response (DR) events or SDC controls, separately or in combination. In both cases, the response would be to isolate themselves from the grid thereby lowering their internal storage to a reduced capacity, and then prohibit re-charging until a later time period (off-peak, for example) to avoid detrimental rebound effects. Using DR, the asset is responding to an event, whereas in the SDC case, the shifting is responding to a common condition on a routine basis.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

The embodiments of the invention in which an exclusive property or privilege is claimed are defined as follows:

1. An electric controller capable of independently operating an electric appliance comprising:
    said controller that controls a standard operation mode and an alternate operation mode of said appliance, said controller that provides information for the timing of said standard operation mode and said alternate operation mode of said appliance by execution of operational commands for said appliance, said controller that autonomously acts in statistical coordination with additional said controllers on a plurality of said appliances that collectively provide a desired load offset to improve anticipated electric power grid conditions.

2. The device of claim 1 further comprising:
    an energy storage module that converts electric energy to another form of energy and stores said energy in a charging mode, said controller that utilizes said stored energy in said alternate operation mode to supplement the electric energy needed for said appliance to perform approximately the same function as said standard operation mode, thereby reducing an end-user's demand for said electric energy during said alternate operation mode.

3. The device of claim 2, wherein said energy storage module stores energy in the form of thermal energy, mechanical energy, chemical energy, or electrical energy.

4. The device of claim 2, wherein said energy storage module stores energy during periods of low electrical demand.

5. The device of claim 1, wherein said controller controls a plurality of said energy storage modules.

6. The device of claim 1, wherein said appliance is an end-use load asset.

7. The device of claim 1, wherein said appliance is a storage asset.

8. The device of claim 1, wherein the initiation of said alternate operation mode of said device is triggered in response to at least one of the following references from the group consisting of:
    preprogrammed timing data, preprogrammed algorithms, time, daylight, ambient temperature, sun position, supplied power quality, power consumption, energy demand, energy consumption, utility load profile, utility supplied signal, historic usage patterns, historic grid load patterns, season, calendar, and day of week.

9. The device of claim 1, wherein said electric appliance is from the group consisting of: a residential appliance, a commercial appliance, a cooling based appliance, a heating based appliance, an electronic appliance, an electric appliance, a lighting appliance, a mechanical appliance, an oven, a water heater, a furnace, a clothes dryer, an air conditioner, a refrigerator, a freezer, a vending machine, a water cooler, a computer, an electric vehicle and a battery storage bank.

10. The device of claim 1, wherein a plurality of autonomous said devices acts to collectively produce a desired net load effect.

11. The device of claim 1, wherein the initiation of said alternate operation mode of each said device is triggered based upon an offset to a reference point, said offset for each said device that is timed in a statistical distribution so that said plurality collectively reduces daily peak load of said electric power grid conditions.

12. An electric appliance capable of operating using standard line voltage AC electricity supplied by an electric power grid in a standard operation mode, capable of storing said AC electricity in another form of energy in a charging mode, and operating using said energy stored with the appliance in an alternate operation mode comprising:
    an energy storage module that converts said AC electric energy to said another form of energy and stores said another form of energy to create stored energy in said charging mode, said appliance that utilizes said stored energy to operate said appliance in said alternate operation mode to perform approximately the same function as said standard operation mode, thereby reducing an end-user's demand for said electric energy during said alternate operation mode;

a controller that independently controls said standard operation mode, said charging mode and said alternate operation mode of said appliance, said controller that contains information for the timing of said standard operation mode, said charging mode and said alternate operation mode of said appliance by execution of operational commands for said appliance, said controller that acts autonomously in statistical coordination with additional said controllers on a plurality of said appliances that collectively provide a desired load offset to improve anticipated electric power grid conditions.

13. The device of claim 12, wherein said energy storage module stores energy in the form of thermal energy, mechanical energy, chemical energy, or electrical energy.

14. The device of claim 12, wherein said energy storage module stores energy during periods of low electrical demand.

15. The device of claim 12, wherein said controller controls a plurality of said energy storage modules.

16. The device of claim 12, wherein said appliance is an end-use load asset.

17. The device of claim 12, wherein said appliance is a storage asset.

18. The device of claim 12, wherein the initiation of said alternate operation mode of said device is triggered in response to at least one of the following references from the group consisting of:
preprogrammed timing data, preprogrammed algorithms, time, daylight, ambient temperature, sun position, supplied power quality, power consumption, energy demand, energy consumption, utility load profile, utility supplied signal, historic usage patterns, historic grid load patterns, season, calendar, and day of week.

19. The device of claim 12, wherein said electric appliance is from the group consisting of: a residential appliance, a commercial appliance, a cooling based appliance, a heating based appliance, an electronic appliance, an electric appliance, a lighting appliance, a mechanical appliance, an oven, a water heater, a furnace, a clothes dryer, an air conditioner, a refrigerator, a freezer, a vending machine, a water cooler, a computer, an electric vehicle and a battery storage bank.

20. The device of claim 12, wherein a plurality of autonomous said devices acts to collectively produce a desired net load effect.

21. The device of claim 20, wherein the initiation of said alternate operation mode of each said device is triggered based upon an offset to a reference point, said offset for each said device that is timed in a statistical distribution so that said plurality collectively reduces daily peak load of said electric power grid conditions.

22. An electric appliance capable of operating using standard line voltage AC electricity in a standard operation mode and operating using energy stored with the appliance in an alternate operation mode comprising:
a thermal energy storage module that converts electric energy to thermal energy and stores said thermal energy in a charging mode, said appliance that utilizes said stored thermal energy to change the temperature within or outside of said appliance in said alternate operation mode thereby reducing an end-user's demand for said electric energy during said alternate operation mode;
a controller that independently controls operation of said thermal energy storage unit and controls said conversion of said electric energy to said thermal energy and supply of said heating or said cooling of said appliance based upon execution of operational commands, said controller that contains information for the timing of said operational commands and that acts autonomously in statistical coordination with additional said controllers on a plurality of said appliances that collectively provide a desired load offset to improve anticipated electric power grid conditions.

23. The system of claim 22, wherein said charging mode is during a period of low electrical demand.

24. The system of claim 22, wherein the initiation of said alternate operation mode of said device is triggered in response to at least one of the following references from the group consisting of:
preprogrammed timing data, preprogrammed algorithms, time, daylight, ambient temperature, sun position, supplied power quality, power consumption, energy demand, energy consumption, utility load profile, utility supplied signal, historic usage patterns, historic grid load patterns, season, calendar, and day of week.

25. The system of claim 22, wherein said plurality of appliances acts to collectively produce a desired net load effect.

26. The system of claim 22, wherein the initiation of said alternate operation mode of each said appliance is triggered based upon an offset to a reference point, said offset for each said appliance that is timed in a statistical distribution so that said plurality of appliances collectively reduces daily peak load of said electric power grid conditions.

27. A method of controlling an electric appliance comprising:
controlling the operation of said electric appliance with a controller associated with said electric appliance;
executing operational commands for switching modes of operation of said electrical appliance based upon information within said controller or directly assessed locally by said controller, between a standard operation mode and an alternate operation mode of said electric appliance, said alternate operation mode that reduces the demand for said electricity from said electric appliance;
timing said standard operation mode and said alternate operation mode based upon trigger points relating to electric power grid conditions;
providing a desired load offset to improve electrical power grid conditions with the cumulative net effect of a plurality of individual said storage appliances operating autonomously in statistical coordination to collectively reduce daily peak load of said electric power grid conditions.

28. The method of claim 27 further comprising the step: facilitating said alternate operation mode of said electric appliances with AC electric energy that has been converted to another form of energy and stored with an energy storage module in a charging mode.

29. The method of claim 28 further comprising the step: converting said AC electric energy and storing said energy in the form of thermal energy, mechanical energy, chemical energy, or electrical energy.

30. The method of claim 28 further comprising the step: storing said energy with said energy storage module during periods of low electrical demand.

31. The method of claim 28 further comprising the step: controlling a plurality of said energy storage modules with said controller.

32. The method of claim 27 further comprising the step: controlling the operation of said electric appliance wherein said appliance is an end-use load asset.

33. The method of claim 27 further comprising the step: controlling the operation of said electric appliance wherein said appliance is a storage asset.

34. The method of claim 27 further comprising the step:
initiating said standard operation mode and said alternate operation mode of said device by at least one of the following said trigger points from the group consisting of:
preprogrammed timing data, preprogrammed algorithms, time, daylight, ambient temperature, sun position, supplied power quality, power consumption, energy demand, energy consumption, utility load profile, utility supplied signal, historic usage patterns, historic grid load patterns, season, calendar, and day of week.

35. The method of claim 27 further comprising the step:
controlling the operation of said electric appliance wherein said electric appliance is from the group consisting of: a residential appliance, a commercial appliance, a cooling based appliance, a heating based appliance, an electronic appliance, an electric appliance, a lighting appliance, a mechanical appliance, an oven, a water heater, a furnace, a clothes dryer, an air conditioner, a refrigerator, a freezer, a vending machine, a water cooler, a computer, an electric vehicle and a battery storage bank.

36. The method of claim 27 further comprising the step:
controlling said plurality of said electric appliances that act to collectively produce a desired net load effect.

37. The method of claim 27 further comprising the step:
initiating said trigger points of said operation modes of said plurality of individual said storage appliances based upon an offset to a reference point;
timing said offset for each said storage appliances to act in statistical coordination with other said storage appliances so that said plurality collectively provide a desired load offset to improve anticipated electric power grid conditions.

38. A method of improving the efficiency, reliability and capacity of an electric power grid containing a multitude of standard electric appliances capable of operating using AC electricity in a standard operation mode comprising:
providing a plurality of stored electric appliances within a power distribution network of said electric power grid, said stored electric appliances capable of operating in said standard operation mode, capable of storing said AC electricity in another form of energy in a charging mode, and capable of operating using said energy stored in said charging mode in a stored operation mode;
supplying AC power to said multitude of standard electric appliances and said plurality of stored electric appliances;
operating said multitude of standard electric appliances in a standard operation mode with said AC electricity;
operating at least a portion of said plurality of stored electric appliances in a standard operation mode with said AC electricity;
charging at least a portion of said plurality of stored electric appliances in a charging mode by converting said AC electric energy to said another form of energy and storing said another form of energy with an energy storage module associated with said stored electric appliances to create stored energy;
operating at least a portion of said plurality of said stored appliances in a stored operation mode for a period of time with said stored energy thereby reducing said demand for said AC electricity from said stored appliances during said time period;
controlling said standard operation mode, said charging mode and said stored operation mode of said stored appliances with a controller that contains information for executing operational commands for said storage appliance;
timing said standard operation mode, said charging mode and said stored operation mode of each said stored electric appliance such that the net cumulative effect of individual said stored electric appliances of said plurality of said stored appliances act autonomously in statistical coordination to collectively provide a desired load offset to improve electric power grid conditions.

39. The method of claim 38 further comprising the step:
converting said AC electric energy and storing said energy in the form of thermal energy, mechanical energy, chemical energy, or electrical energy.

40. The method of claim 38 further comprising the step:
storing said energy with said energy storage module during periods of low electrical demand.

41. The method of claim 38 further comprising the step:
initiating said standard operation mode and said alternate operation mode of said device by at least one of the following trigger points from the group consisting of:
preprogrammed timing data, preprogrammed algorithms, time, daylight, ambient temperature, sun position, supplied power quality, power consumption, energy demand, energy consumption, utility load profile, utility supplied signal, historic usage patterns, historic grid load patterns, season, calendar, and day of week.

42. A system for improving the efficiency, reliability and capacity of an electric power grid containing a multitude of standard electric appliances capable of operating using AC electricity in a standard operation mode comprising:
a means for providing a plurality of stored electric appliances within a power distribution network of said electric power grid, said stored electric appliances capable of operating in said standard operation mode, capable of storing said AC electricity in another form of energy in a charging mode, and capable of operating using said energy stored in said charging mode in a stored operation mode;
a means for supplying AC power to said multitude of standard electric appliances and said plurality of stored electric appliances;
a means for operating said multitude of standard electric appliances in a standard operation mode with said AC electricity;
a means for operating at least a portion of said plurality of stored electric appliances in a standard operation mode with said AC electricity;
a means for charging at least a portion of said plurality of stored electric appliances in a charging mode by converting said AC electric energy to said another form of energy and storing said another form of energy with an energy storage module associated with said stored electric appliances to create stored energy;
a means for operating at least a portion of said plurality of said stored appliances in a stored operation mode for a period of time with said stored energy thereby reducing said demand for said AC electricity from said stored appliances during said time period;
a means for controlling said standard operation mode, said charging mode and said stored operation mode of said stored appliances with a controller that contains information for executing operational commands for said storage appliance;
a means for timing said standard operation mode, said charging mode and said stored operation mode of each said stored electric appliance such that the net cumulative effect of individual said stored electric appliances of said plurality of said stored appliances act autonomously in statistical coordination to collectively provide a desired load offset to improve electric power grid conditions.

* * * * *